US011812854B2

(12) United States Patent
Blackowiak

(10) Patent No.: US 11,812,854 B2
(45) Date of Patent: Nov. 14, 2023

(54) GAMING SUPPORT PAD

(71) Applicant: Jacob S. Blackowiak, St. Bonifacious, MN (US)

(72) Inventor: Jacob S. Blackowiak, St. Bonifacious, MN (US)

(73) Assignee: Jacob S. Blackowiak, St. Bonifacious, MN (US)

( * ) Notice: Subject to any disclaimer, the term of this patent is extended or adjusted under 35 U.S.C. 154(b) by 252 days.

(21) Appl. No.: 17/148,883

(22) Filed: Jan. 14, 2021

(65) Prior Publication Data

US 2021/0219734 A1  Jul. 22, 2021

Related U.S. Application Data

(60) Provisional application No. 62/961,946, filed on Jan. 16, 2020.

(51) Int. Cl.
| | |
|---|---|
| *A47C 16/00* | (2006.01) |
| *B32B 5/22* | (2006.01) |
| *A47C 27/14* | (2006.01) |
| *A47G 9/10* | (2006.01) |
| *A47C 20/00* | (2006.01) |
| *A47C 27/22* | (2006.01) |
| *A47C 27/15* | (2006.01) |
| *A47B 23/00* | (2006.01) |
| *A47C 20/02* | (2006.01) |

(52) U.S. Cl.
CPC ............ *A47C 16/00* (2013.01); *A47C 27/142* (2013.01); *B32B 5/22* (2013.01); *A47B 23/002* (2013.01); *A47B 2200/0091* (2013.01); *A47C 20/00* (2013.01); *A47C 20/023* (2013.01); *A47C 27/14* (2013.01); *A47C 27/15* (2013.01); *A47C 27/22* (2013.01); *A47G 2009/1018* (2013.01)

(58) Field of Classification Search
CPC ....... A47C 16/00; A47C 27/142; A47C 27/14; A47C 27/15; A47C 27/22; A47C 20/00; A47C 20/023; A47C 7/54; B32B 5/22; A47B 23/002; A47B 2200/0091; A47B 21/0371; A47B 2021/0307; A47B 2021/0378; A47G 2009/1018; B60N 2/75
USPC .................................. 248/118, 118.1, 118.5
See application file for complete search history.

(56) References Cited

U.S. PATENT DOCUMENTS

| | | | | | |
|---|---|---|---|---|---|
| 3,757,365 | A | * | 9/1973 | Kretchmer | ............... A47G 9/10 5/636 |
| 4,550,458 | A | * | 11/1985 | Fiore | ...................... A47G 9/109 5/640 |
| 4,726,624 | A | * | 2/1988 | Jay | ........................ A61G 5/1091 297/452.41 |
| 4,765,583 | A | * | 8/1988 | Tenner | .................. A47B 23/002 248/444 |
| 5,081,936 | A | * | 1/1992 | Drieling | ................. B60N 3/002 108/43 |
| 5,137,333 | A | * | 8/1992 | Chee | ........................ A47C 3/16 5/652 |

(Continued)

*Primary Examiner* — Nkeisha Smith
(74) *Attorney, Agent, or Firm* — Christopher R. Christenson; Kelly, Holt & Christenson. P. L.L.C.

(57) ABSTRACT

A gaming support pad includes a cover having fill material therein that forms at least one feature on a side of the gaming support pad. The gaming support pad further includes a pad, enclosed by the cover, the pad comprising a plurality of different material layers.

16 Claims, 8 Drawing Sheets

(56) References Cited

U.S. PATENT DOCUMENTS

| | | | | |
|---|---|---|---|---|
| 5,214,814 | A * | 6/1993 | Eremita | A47G 9/109 5/636 |
| 5,461,741 | A * | 10/1995 | Graebe | A47C 27/146 297/284.6 |
| 5,551,109 | A * | 9/1996 | Tingley | A47D 13/02 5/655 |
| 5,675,853 | A * | 10/1997 | Linge | A47D 13/08 5/655 |
| 5,892,499 | A * | 4/1999 | Vulk, Jr. | G06F 3/0395 345/157 |
| 6,578,218 | B2 * | 6/2003 | Wassilefsky | A61G 7/0755 5/640 |
| 6,817,049 | B1 * | 11/2004 | Hall | A47G 9/109 5/636 |
| 6,957,612 | B2 * | 10/2005 | Conlee | A47B 23/002 108/43 |
| 7,107,639 | B2 * | 9/2006 | Taricani | A47D 13/08 5/915 |
| 7,322,063 | B2 * | 1/2008 | Esimai | A47B 23/002 5/653 |
| 7,464,423 | B2 * | 12/2008 | Goodwin | A47D 13/083 5/640 |
| 7,481,402 | B2 * | 1/2009 | Woodward | A47C 16/00 248/118.1 |
| 7,614,704 | B2 * | 11/2009 | Whelan | A61G 5/1043 297/452.25 |
| 7,891,033 | B2 * | 2/2011 | Loewenthal | A61G 5/1043 297/452.21 |
| 7,946,655 | B2 * | 5/2011 | Hsu | A47C 27/144 297/452.46 |
| 8,448,275 | B1 * | 5/2013 | Leach | A47C 27/086 5/655 |
| 8,813,282 | B2 * | 8/2014 | Roban | A47G 9/1081 5/636 |
| 9,095,231 | B2 * | 8/2015 | Abdo | A47G 9/1009 |
| 9,113,719 | B2 * | 8/2015 | Kummerfeld | A47D 13/00 |
| 9,138,084 | B1 * | 9/2015 | Namolovan | A47G 9/007 |
| 9,220,345 | B2 * | 12/2015 | Davis | A47C 7/029 |
| 10,111,526 | B2 * | 10/2018 | Davis | A47G 9/10 |
| 10,362,852 | B2 * | 7/2019 | Halloway | A45D 29/22 |
| 10,602,850 | B2 * | 3/2020 | Green | A61F 5/3761 |
| 10,638,860 | B1 * | 5/2020 | Duncan | A47G 9/1081 |
| 11,278,134 | B2 * | 3/2022 | Li | G06Q 30/0631 |
| 11,412,870 | B2 * | 8/2022 | Gonzalez Diaz | A47G 9/10 |
| 2014/0182049 | A1 * | 7/2014 | Prust | A42B 3/12 36/43 |
| 2014/0245538 | A1 * | 9/2014 | Lee | A47C 27/148 5/632 |
| 2017/0354277 | A1 * | 12/2017 | Wagner | A47G 9/1027 |
| 2018/0184820 | A1 * | 7/2018 | Johnson | A47G 9/109 |
| 2018/0242750 | A1 * | 8/2018 | Wilson | A47C 7/383 |
| 2021/0068562 | A1 * | 3/2021 | Cuthbert | A47G 9/10 |
| 2021/0127867 | A1 * | 5/2021 | Lee | A47C 7/383 |
| 2021/0337990 | A1 * | 11/2021 | Hsiao | A47G 9/1081 |
| 2021/0369019 | A1 * | 12/2021 | Ambuske | A47G 9/1045 |
| 2022/0265464 | A1 * | 8/2022 | Baek | A47G 9/10 |

* cited by examiner

GAMING SUPPORT PAD

CROSS REFERENCE TO RELATED APPLICATION

This application claims the benefit of U.S. Provisional Application 62/961,946, filed Jan. 16, 2020, the entire contents of which are incorporated herein by reference.

While playing video games on, for example, a console or computer, a user is often in a seated position while interacting with a user input device, such as a controller or keyboard, to control various aspects of the video game, such as a character, displayed on a screen.

The discussion above is merely provided for general background information and is not intended to be used as an aid in determining the scope of the claimed subject matter. The claimed subject matter is not limited to implementations that solve any or all disadvantages noted in the background.

Figure 1:
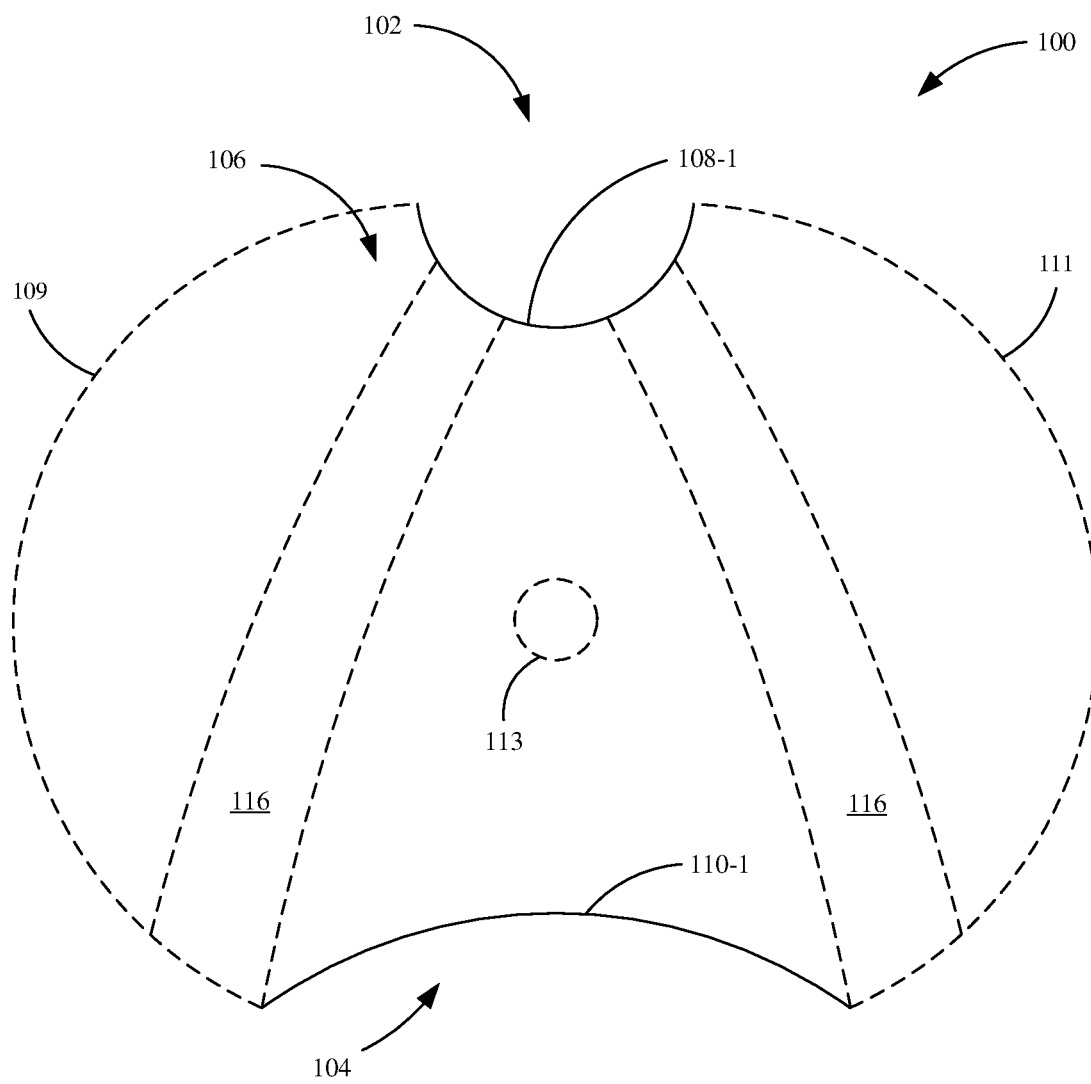
FIGS. 1-2 are top views showing example gaming support pads.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

SUMMARY

A gaming support pad includes a cover having fill material therein that forms at least one feature on a side of the gaming support pad. The gaming support pad further includes a pad, enclosed by the cover, the pad comprising a plurality of different material layers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

During a video gaming session, a user can be in a seated position while interacting with a user input device, such as a controller or keyboard and mouse, while viewing a display device. These gaming sessions can last for an extended period of time, for example, hours. Additionally, a user may sit in forward-leaning position to assist with, for instance, focus or hand-eye coordination. In this forward position, a user leans forward with their upper body and can rest their elbows and/or forearms on a surface, for example, their legs or a desk. While this forward-leaning position can assist in the user's performance and/or gaming experience, it can also lead to a variety of posture-related problems. For example, carpal tunnel syndrome, back pain, head and/or neck pain, as well as a variety of other symptoms.

Examples described herein provide a gaming support pad configured to provide comfort and/or ergonomic support to a user in a gaming posture, for example, a forward-leaning posture. In some examples, the gaming support pad has a surface geometry that is contoured such that it conforms to a user's position while playing video games. For example, the gaming support pad can include recesses that are configured to allow portions of a user's body therein for more comfortable use of the gaming support pad. Additionally, these recesses can be used to provide a proper alignment of the gaming support pad with the user's body as well as to position the user in an ergonomic posture.

The gaming support pad can include any number of layers made of any number of materials. These layers can have a variety of dimensions. Additionally, these layers can have various levels of firmness.

In further examples, the gaming support pad can include electronics. For example, the gaming support pad can include input/output ports (e.g., USB/micro-USB, AUX, power port, etc.), power source(s), charging stations (e.g., battery charging), as well as a variety of other electrical components and/or devices.

Figure 2:
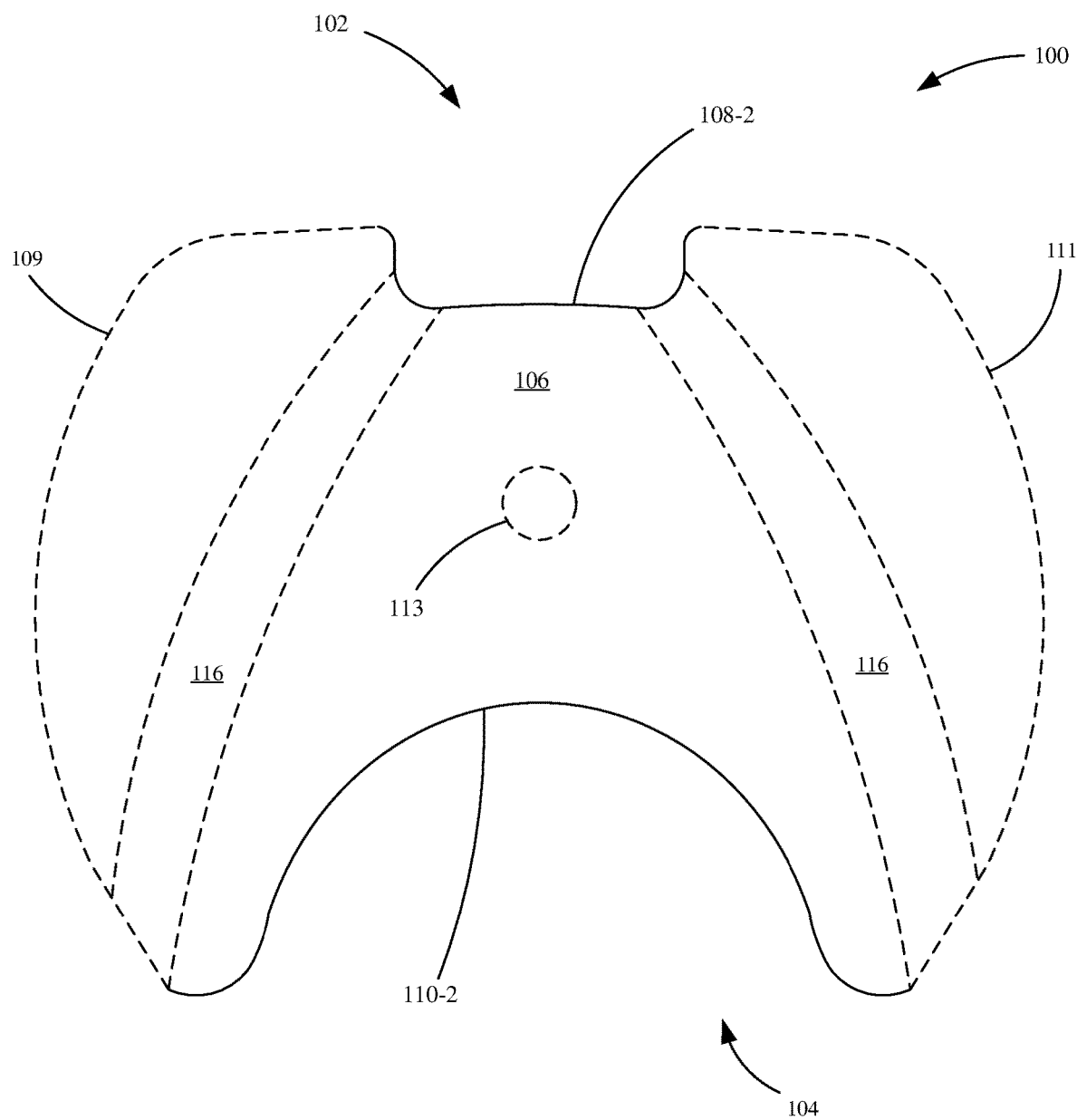

FIGS. 1 and 2 are top views showing examples of a gaming support pad 100. Gaming support pad 100 includes forward-facing side 102, rearward-facing side 104, top side 106, recesses 108 (illustratively shown in one example as 108-1 and in another example as 108-2) and 110 (illustratively shown in one example as 110-1 and in another example as 110-2), left side 109, right side 111, opening 113 and recesses 116. As illustrated in FIG. 1, gaming support pad 100 has a forward-facing side 102 (e.g., front side) configured to face away from the user. Included (or disposed) on forward-facing side 102 is recess 108 which is contoured such that a user's hands, which can be interacting with and/or holding a user input mechanism (e.g., a controller), are allowed an approximately free range of motion while the wrists are supported by a surface of top side 106. The area defined by the perimeter of recess 108, in one example, creates a space large enough to, for instance, allow two hands to move thereabout. In another example, the area defined by the perimeter of recess 108 creates a space large enough to, for instance, allow a user to hold and interact with a gaming console controller therein.

In the example illustrated in FIG. 1, looking from left-to-right, recess 108-1 extends from a point towards the left-end of forward-facing side 102, and along the perimeter thereof, in a semi-circular fashion progressively towards rearward-facing side 104 (e.g., back/rear side), reaching an approximate midway-point, which defines the furthest extent of recess 108-1 towards rearward-facing side 104. From the approximate midway-point, recess 108-1 extends, in a semi-circular fashion, back toward the perimeter of forward-facing side 102 at a point more towards the rightend of the perimeter of forward-facing side 102. Thus, recess 108-1 forms an approximately semi-circularly shaped opening.

In the example illustrated in FIG. 2, looking from left-to-right, recess 108-2 extends from a point towards the left-end of forward-facing side 102, and along the perimeter thereof, in an approximately semi-circular fashion progressively towards rearward-facing side 104, reaching a point which defines the furthest extent of recess 108-2 towards rearward facing side 104. From the point, recess 108-2 extends in an approximately linear fashion towards the right end of forward-facing side 102 for a distance. From there, recess 108-2 extends in a semi-circular fashion back toward the perimeter of forward-facing side 102. Thus, recess 108-2 forms an approximately "U" shaped opening, however, the bottom of the "U" is approximately perpendicular relative to the sides of the "U."

As illustrated in FIGS. 1 and 2, gaming support pad 100 has a rearward-facing side 104 configured to face toward the user. Included (or disposed) on rearward-facing side 104 is a recess 110 which is contoured such that a portion of the user's body (e.g., torso, waist, abdomen, etc.) can be disposed therein. This can allow, for instance, a user to adjust the position of gaming support pad 100 closer or further from their body to, for example, allow for more adjustability with regard to a desired posture (e.g., sitting up straighter, leaning farther forward, etc.) and/or compensate for differences in body dimensions (e.g., length of arms).

In the example illustrated in FIG. 1, looking from left-to-right, recess 110-1 extends from a point towards the left-end of rearward-facing side 104, and along the perimeter thereof, in a semi-circular fashion progressively towards forward-facing side 102, reaching an approximate midway-point, which defines the furthest extent of recess 110-2 towards forward-facing side 102. From the approximate midway-point, recess 110-1 extends, in a semi-circular fashion, back toward the perimeter of rearward-facing side 104. Thus, recess 110-1 forms an approximately semi-circularly shaped opening.

Recess 110-2, as illustrated in FIG. 2, is similar to recess 110-1. However, recess 110-2 extends further towards forward-facing side 102, as compared to recess 110-1, before reaching the midway-point and extending back towards rearward-facing side 104. Thus, recess 110-2 forms a larger opening in rearward-facing side 104, relative to recess 110-1.

While particular shapes and sizes of recesses 108 and 110 are illustrated FIGS. 1-2, it is to be understood that recesses 108 and 110 can include any number of shapes and sizes.

As illustrated in FIGS. 1 and 2, gaming support pad 100 includes left side 109 and right side 111, represented by dashed lines. The lines representing sides 109 and 111 are dashed to indicate that the directionality of sides 109 and 111 is optional, or rather, can be modified. For example, while sides 109 and 111 are shown extending from forward-facing side 102 to rearward-facing side 104 (or vice-versa) in an approximately semi-circular fashion, it is to be understood that sides 109 and 111 can include any number of directionalities, for example, but not limited to, an approximately linear directionality. Additionally, and as will be discussed further with reference to FIGS. 3A and 3B below, the distance between left side 109 and right side 111 (e.g., length of gaming support pad 100) can be any number of distances.

Gaming support pad 100 also optionally includes opening 113. In one example, opening 113 can include an aperture extending from top side 106, through gaming pad 100, to a bottom side 107 (shown in FIGS. 3A and 3B) of gaming support pad 100. In one example, opening 113 is configured to allow a variety of cords therethrough, for instance, but not limited to, power cords, headphone cords, controller/keyboard cords, etc. In this way, cords do not have to lay across top side 106 and interfere with a user's access to or enjoyment of gaming pad 100. While opening 113 is shown in approximate middle of gaming support pad 100, it is to be understood that opening 113 can be disposed anywhere along top side 106.

As illustrated in FIGS. 1 and 2, gaming support pad 100 optionally includes recesses 116, represented by dashed lines. Recesses 116 include contours in and extend across top side 106. Recesses 116 can include a variety of recesses, for example, a channel (e.g., a U-shaped channel). Recesses 116 can be configured to receive one or more portions of a user's body, for instance, a portion of a user's arms (e.g., forearms). In the example shown, recesses 116 extend diagonally from rearward-facing side 104 to forward-facing side 102, more specifically, to recess 108. In this way, a user's can insert his or her arms (e.g., forearms) into recesses 116 such that the user's elbows rest on gaming support pad 100 and the user's hands are disposed in recess 108. The diagonality of recesses 116 mimic a user's desired posture in a forward-leaning position (e.g., typically elbows resting on legs, forearms extending inwardly from the elbow, hands disposed within the area defined by the legs). In some examples, gaming support pad 100 can put or maintain a user's body in an ergonomic alignment (e.g., elbows bent at approximately 90°, sitting up straighter, shoulders back, etc.). It should be understood, however, that recesses 116 can include any number of directionalities and any number of lengths. For example, recesses 116 can extend from any point on gaming pad 100 to any other point on gaming support pad 100 in any number of directions.

Figure 3A:
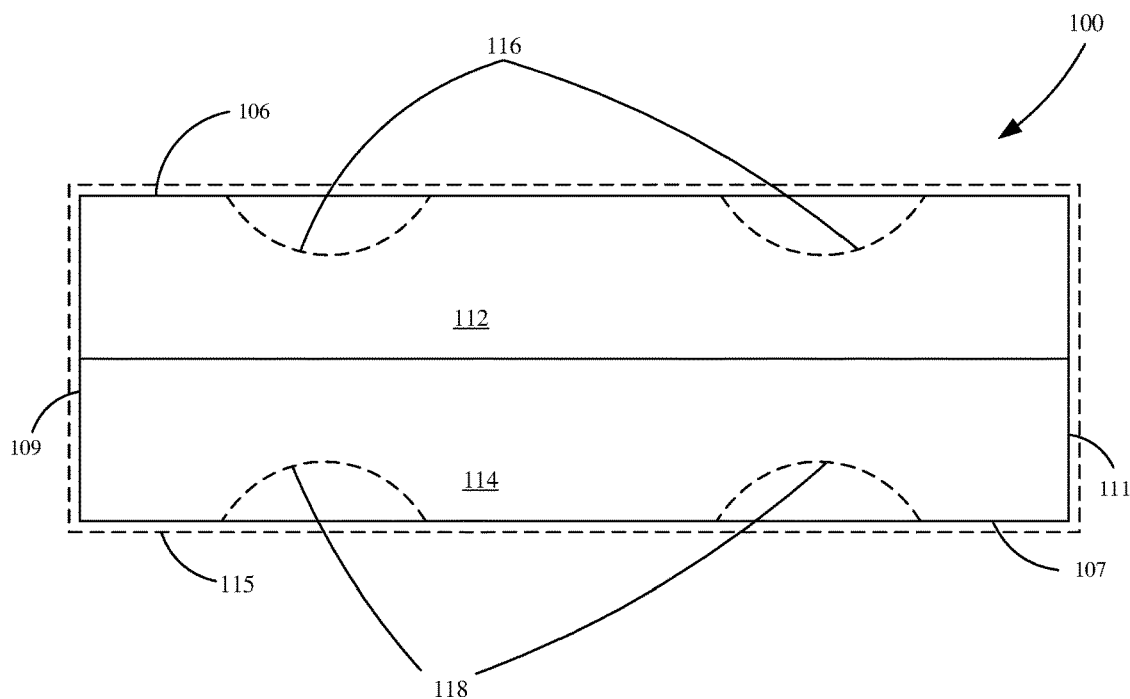
FIGS. 3A-3B are side views showing example profiles of gaming support pads.
Figure 3B:
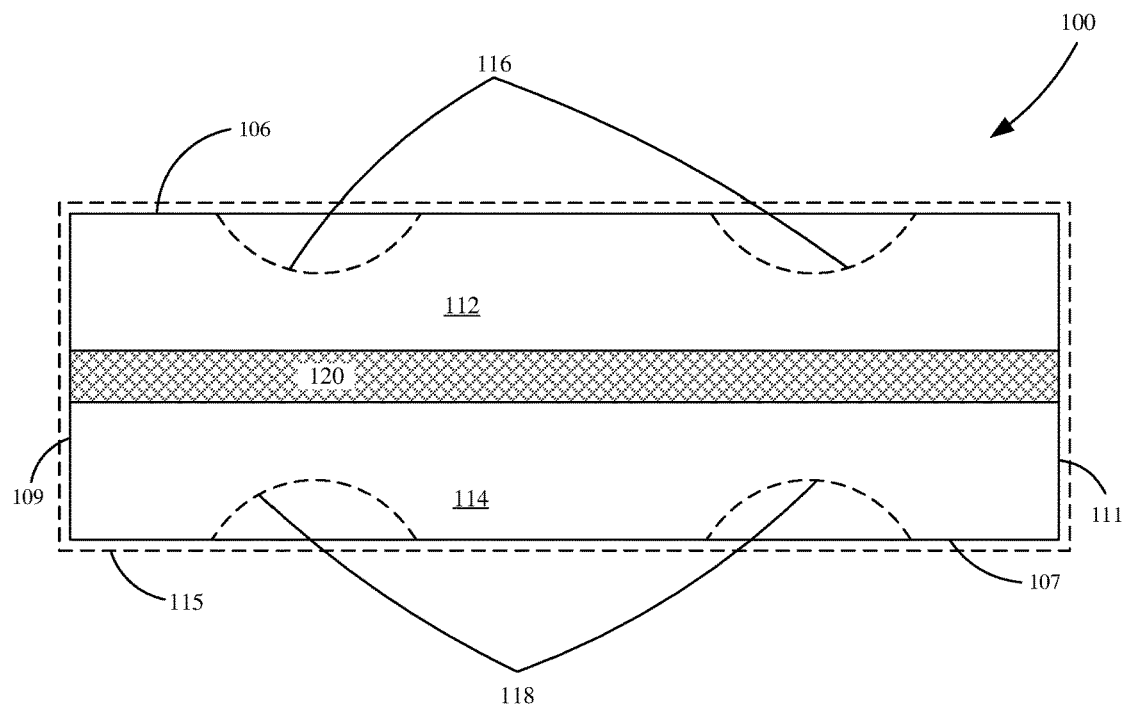

FIGS. 3A-3B are side views showing example profiles of gaming support pad 100. Gaming support pad 100 includes top side 106, left side 109, right side 111, cover 115, material layers 112, 114 and 120 and recesses 116 and 118. As illustrated, gaming support pad 100 includes a number of material layers. In the example shown in FIG. 3A, gaming support pad includes a top material layer 112 and a bottom material layer 114. In the example shown in FIG. 3B, gaming support pad 100 further includes a middle material layer 120 disposed between layers 112 and 114. While a plurality of material layers are shown, it is to be understood that gaming support pad can include any number of material layers, including, but not limited to, a single material layer. Additionally, the material layers can include any number of suitable materials, including, but not limited to, foam, latex, polyester (e.g., polyester batting), fibers (e.g., polyester, wool, cotton), feathers (e.g., goose down), hempure, flax, rubber, as well as a variety of other materials. In one example, the individual material layers include the same material. In another example, the individual material layers each includes a different material. In one example, middle layer 120 includes a firmer material (e.g., firmer foam, wood, fiberboard, polymers, etc.) than either top layer 112 or bottom layer 114. In this way, middle layer 120 provides additional support to maintain the shape of gaming support pad 100 as well as to provide firmer cushion to the user.

Additionally, gaming support pad 100, including the individual material layers 112, 114 and 120, can be of a variety of dimensions. In one example, gaming support pad 100 is approximately three inches thick (e.g., tall). In one example, top layer 112 is approximately two inches thick. In one example, bottom layer 114 is approximately one inch thick. In another example, middle layer 120 has a thickness in the range of one-eighth to one-quarter inches. In one example, top layer 112 is thicker than bottom layer 114. In one example, top layer 112 is thinner than bottom layer 114. In another example, top layer 112 and bottom layer 114 are of approximately the same thickness. In one example, middle layer 120 is thinner than either top layer 112 or bottom layer 114. In one example, all of the layers are of the same thickness. In another example, each layer has a different thickness than the other layers. Additionally, gaming support pad 100 can have a variety of widths (e.g., the distance between forward-facing side 102 and rearward-facing side 104) and lengths (e.g., the distance between left side 109 and right side 111). In one example, gaming support pad 100 is configured to fit between the arm rests of various furniture, including, but not limited to, gaming chairs, office chairs, etc.

The material layers can be coupled (e.g., bonded) together using a variety of suitable techniques, for example, but not limited to, chemical adhesives (e.g., glue).

As illustrated in FIGS. 3A and 3B, gaming support pad 100 optionally includes, as indicated by dashed lines, recesses 116 and 118. Recesses 116 are included (or disposed) on top side 106 in top material layer 112. Recesses 116 include contours in top side 106. In one example, recesses 116 include a channel extending for a certain distance along top side 106. In one example, recesses 116 extend from rearward-facing side 104 to forward-facing side 102. In one example, recesses 116 extend from a first given point on top side 106 (e.g., rearward-facing side 104, recess 110, or any other point) to a second given point on top side 106 (e.g., forward-facing side 102, recess 108, or any other point). Recesses 116 are, in one example, configured to receive a portion of a user's body. For example, recesses 116 are contoured to receive a portion of a user's arms (e.g., forearms). In another example, recesses 116 include a directionality from end to end and/or a dimensionality configured to maintain proper alignment of gaming support pad 100 relative to the user and/or put and maintain a user's body in ergonomic alignment (e.g., proper posture), for example, maintaining an elbow bend of approximately 90° and/or an arm angle (relative to either front-facing side 102 or rearward facing side 104) of approximately 45°. It should be noted that recesses 116 can include any number of directionalities and/or dimensionalities.

In the examples illustrated in FIGS. 3A and 3B, looking from left-to-right, recesses 116 extend from a point on top side 106 in an approximately semi-circular fashion progressively towards bottom side 107, reaching a midway-point which defines the furthest extent of recesses 116 towards bottom side 107. From the midway-point, recesses 116 extend in an approximately semi-circular fashion back toward top side 106. Thus, recesses 116 form an approximately semi-circularly shaped channel.

Recesses 118 are included (or disposed) on bottom side in bottom material layer 114. Recesses 118 include contours in bottom side 107. In one example, recesses 118 include a channel extending for a certain distance along bottom side 107. In one example, recesses 116 extend from rearward-facing side 104 to forward-facing side 102. In one example, recesses 118 extend from a first given point on bottom side 107 (e.g., rearward-facing side 104, recess 110, or any other point) to a second given point on bottom side 107 (e.g., forward-facing side 102, recess 108, or any other point). Recesses 118 are, in one example, configured to receive a portion of a user's body. For example, recesses 118 are contoured to receive a portion of a user's leg (e.g., top of upper leg [e.g., quadriceps area]). In another example, recesses 118 include a directionality from end to end and/or a dimensionality configured to maintain proper alignment of gaming pad 100 relative to the user and/or put and maintain a user's body in ergonomic alignment.

In the examples illustrated in FIGS. 3A and 3B, looking from left-to-right, recesses 118 extend from a point on bottom side 107 in an approximately semi-circular fashion progressively towards top side 106, reaching a midway-point which defines the furthest extent of recesses 118 towards top side 106. From the midway-point, recesses 118 extend in an approximately semi-circular fashion back toward bottom side 107. Thus, recesses 118 form an approximately semi-circularly shaped channel.

While particular shapes and sizes of recesses 116 and 118 are illustrated in FIGS. 3A and 3B, it is to be understood that recesses 116 and 118 can includes any number of shapes and sizes.

As illustrated in FIGS. 3A and 3B, gaming support pad optionally includes, as indicated by dashed lines, cover 115. Cover 115 can be configured to protect gaming support pad 100 (e.g., material layers). For example, cover 115 can prevent material layers from being damaged or otherwise contaminated by, for instance, dust, dirt, debris, food and beverage spills/stains, etc. Cover 115 can be configured (e.g., include certain material(s)) to increase the comfort of gaming support pad 100, for example, cover 115 can include a soft material and/or include padding. Cover 115 can be substantially permanent (e.g., not purposefully removable) or removable by, for example, but not limited to, any number of fasteners (e.g., zippers, buttons, etc.), or cover 115 can include a slip-cover. Cover 115 can include any number of suitable materials, for example, but not limited to, a variety of fabrics, for instance, fabrics suitable for the upholstery of furniture, or the covering of items such as pillows, beds, etc. Cover 115 can include any number of colors, and can include additional features (e.g., customizable features) such as logos, designs, etc. While a space between the cover and the material layers are shown in FIGS. 3A and 3B, this need not be the case. In some examples, cover contours contacts the material layers, such that the cover conforms over the surfaces of the material layers.

Figure 4:
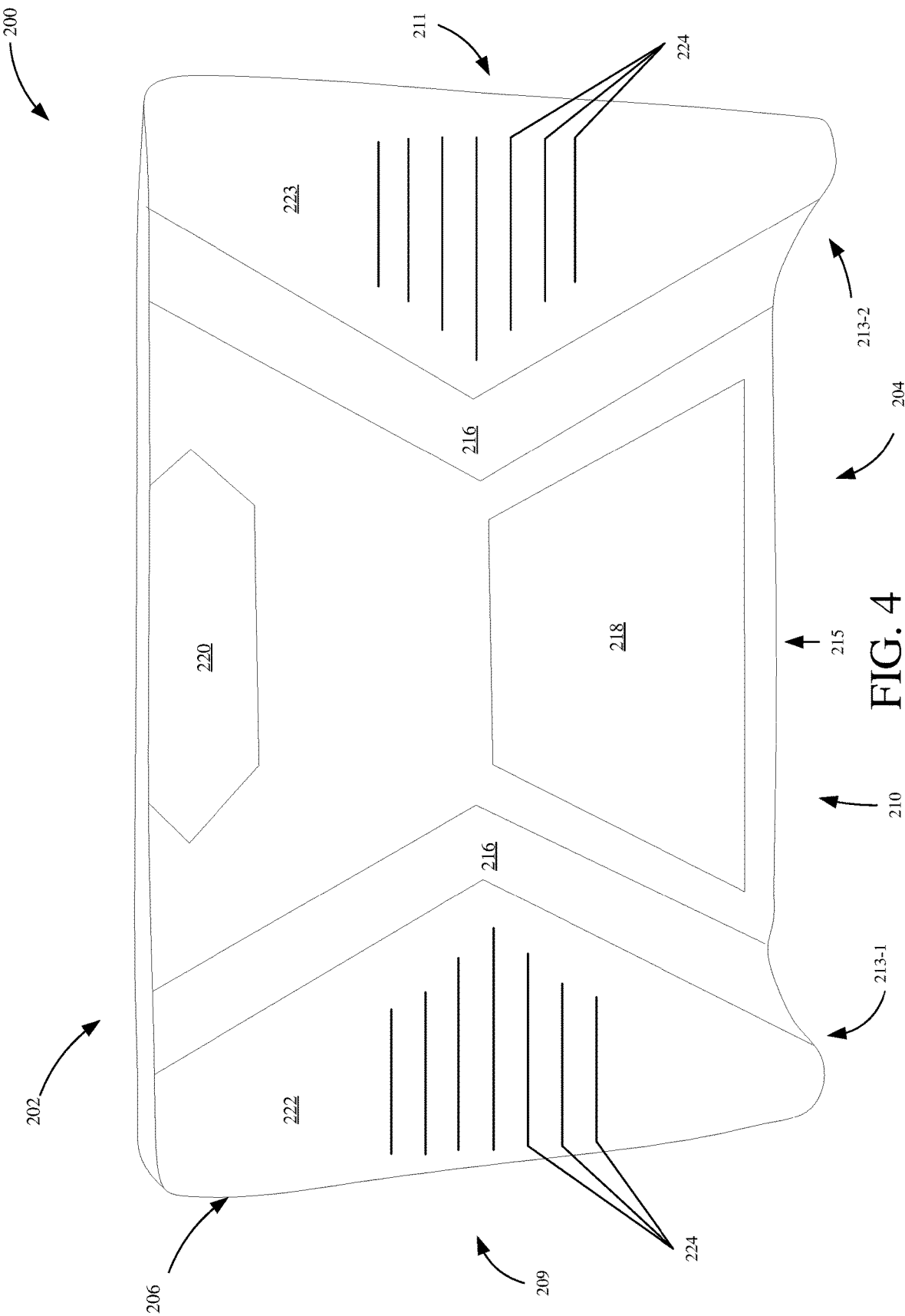
FIG. 4 is a top view showing an example gaming support pad.

FIG. 4 is a top view showing one example of a gaming support pad 200. Gaming support pad 200 illustratively includes a cover 245 (shown in FIG. 6) that includes till material, such as padding, that forms one or more features on sides of gaming support pad 200. As illustrated in FIG. 4, gaming support pad 200 includes forward-facing side 202 (e.g., front side), rearward-facing side 204 (e.g., back/rear side), top side 206, left side 209, right side 211, recess 210, extended portions 213 (illustratively shown as 213-1 and 213-2), recesses 216, recess 218, raised surface 220, left side surface 222, right side surface 223, and surface features 224. As illustrated, gaming support pad 200 includes a forward-facing side 202 configured to face away from a user.

Gaming support pad further includes a rearward-facing side 204 configured to face toward a user. Included (or disposed) on the rearward-facing side is a recess 210 which is contoured such that a portion of a user's body (e.g., torso, waist, abdomen, etc.) can be disposed therein. This can allow, for instance, a user to adjust the position of gamin support pad 250 closer or further from their body to, for example, allow for more adjustability with regard to a desired posture (e.g., sitting up straighter, leaning farther forward, etc.) and/or compensate for differences in body dimensions (e.g., differences in arm lengths). In the example illustrated in FIG. 4, the cover 245 of gaming support pad 200 includes padding or other fill material that defines or otherwise forms various features included in gaming support pad 200, such as recess 210. For example, gaming support pad 200 can include an inner pad 250 (shown in FIGS. 6-7B) that is generally rectangular in shape and generally flat across one or more of its surfaces, and thus, the padding (or other fill material) in cover 245 forms the recess 210 (as well as other features included or disposed on sides of gaming support pad 200), for example a semi-circular recess as shown in FIG. 4. In the illustrated example, recess 210 extends from a portion of rearward-facing side 204 in a semi-circular fashion towards forward-facing side 202 until reaching an approximate limit where recess 210 extends across a length of gaming support pad and then extends back towards a portion of rearward-facing side 204 in a semi-circular fashion.

Rearward-facing side 204 includes extended portions 213 (left extended portion 213-1 and right extended-portion 213-1). Extended portions 213 are formed by padding or fill material of cover 245. Extended portions 213 form recess 210 in rearward-facing side 214. For example, the semi-circular portion on the left of recess 210 is formed by left extended portion 213-1 whereas the semi-circular portion of the right of recess 210 is formed by right extended portion 213-2. Recess further includes a generally straight portion that extends across a length of gaming support pad 200, which is generally indicated by 215. In one example, the generally straight portion indicated by 215 is formed by an edge of inner pad 250. Thus, extended portions 213 are so referred due to their extension beyond the rearward-side (e.g., back/rear) or edge of inner pad 250. In some examples, other sides of gaming support pad 200 may conform to sides or edges of inner pad, for example, as shown, left side 209, right side 211, and forward-facing side 202 can conform to the sides or edges (e.g., left, right, and/or forward/front sides or edges, respectively) of inner pad 250.

As illustrated in FIG. 4, gaming support pad 200 includes various features on top side 206 such that the height of a surface of top side 206 is variable across its surface area. As shown, top side 206 includes recesses 216, recess 218, raised surface 220, left side surface 222, right side surface 223, and surface features 224. These various features of top side 206 are formed by padding or other fill material disposed in cover 245. The padding or other fill material can include any number of different materials, such as various foams, latex, gels, various natural or synthetic materials, as well as various other suitable padding or fill material. In some examples, the padding or fill material is cover 245 is made from the same material, while in other examples the padding or fill material in cover 245 varies in material type for different features. Recesses 216 and 218 have a lower height, relative to other features (such as left side surface 222, right side surface 223, raised surface 220, and/or surface features 224).

Recesses 216, as illustrated, extend from a portion of rearward-facing side 204 (near an end of rearward-facing side 204, such as the left end or right end) towards an interior of gaming support pad 200 and then towards an exterior of gaming support pad to a portion of forward-facing side 202 (near an end of forward-facing side 202, such as the left end or right end) forming an arrowhead like shape. Recesses 216, having a lower height relative to other features of top side 206, allow for the travel of air across gaming support pad 200, such as a flow of air under a user's arms when the user's arms are resting on gaming support pad 200. This air flow can serve to maintain a user's skin temperature, or otherwise slow or prevent an increase in a user's skin temperature. Further, such air flow can reduce or prevent sweating. Additionally, a user's arm need not be in contact with the entirety of top side 206 by virtue of the relatively lower height of recesses 216. For example, a user's arm may extend across recess 216 such that a portion of arm bridges over recess 216, said portion being out contact with top side 206.

Recess 218, as illustrated, forms a trapezoid like cavity in a portion of top side 206, though other shapes are also contemplated. Recess 218 has a lower height relative to other features of top side 206 (such as left side surface 222, right side surface 223, raised surface 220, and/or surface features 224). In some examples recess 218 may have the same height as one or more of recesses 216. In other examples, recess 218 and one or more of recesses 216 may have different heights. Recess 218 is configured to receive an item while the walls of recess 218 prevent the items from sliding off of top side 206.

Raised surface 220 is near forward-facing side 202, and, in the illustrated example, a side of raised surface 220 is formed by forward-facing side 202, though other placements are also contemplated herein. Raised surface 220 has a higher height relative to other features of top side 206 (such as recesses 216, recess 218, left side surface 222, and/or right side surface 223). Raised surface 220 is formed by padding or other fill material in cover 245 and is configured to receive and provide additional support for a portion of a user's body, such as a user's hand(s) or wrist(s). Raised surface 220 can thus provide additional comfort and/or ergonomic benefits to a user.

As illustrated in FIG. 4, top side 206 also includes left side surface 222 and right-side surface 223. Surfaces 222 and 223 can have a higher height relative to some features of top side 206 (such as recesses 216 and/or recess 218) and a lower height relative to some other features of top side 206 (such as raised surface 220 and/or surface features 224). Surfaces 222 and 223, as illustrated, can also include surface features 224, which, as shown, are raised surfaces disposed on the surface area of surfaces 222 and 223. Surface features 224 have a higher height relative to surfaces 222 and 223 (as well as other features of top side 206, such as recesses 216 and/or recess 218) but may also have a lower height relative to other features of top side 206 (such as raised surface 220). Surface features 224, in one example, provide slip resistance for an item or a portion of a user's body (such as a user's elbows or forearms). While shown in FIG. 4 as having various lengths, it should be noted that one or more surface features 224 can have a same length as one or more other surface features 224. In some examples, each of the plurality of surface features 224 has the same length. In some examples, each of the plurality of surface features 224 has the same height. In some examples, at least one of the plurality of surface features 224 has a different height than at least one other surface feature 224 of the plurality of surface features 224. In some examples, surface features 224 can be considered a raised surface of gaming support pad 200. Additionally, while a particular number of surface features 224 are shown in FIG. 4, it should be noted that more or less surface features 224 can be included on gaming support pad 200.

In one example, during use of gaming support pad 200, a user may place a portion of their body (such as elbow(s) and/or forearm(s)) on surfaces 222 and 223, while a remainder of the user's arm extends across recesses 216, where, in some examples, the user may rest his or her wrists or hands on raised surface 220. Thus, during use, gaming support pad 200 can provide comfort and ergonomic support for a user in a gaming stance wherein the user is wresting their elbows and/or forearms (which may include wrists) on gaming support pad 200. In said gaming stance, the user's elbows may be pointed outwardly while their wrists are pointed inwardly. Said user may be leaning forward, sitting straight up, or leaning backward during the use of gaming support pad 200. In some examples, in the gaming stance, a user's elbows may be bent at an approximately 90° angle. In some examples, in the gaming stance, a user's arms may form an approximately 45° angle relative to a user's torso. These are merely some examples of the posture of a user of gaming support pad 200.

Figure 5:
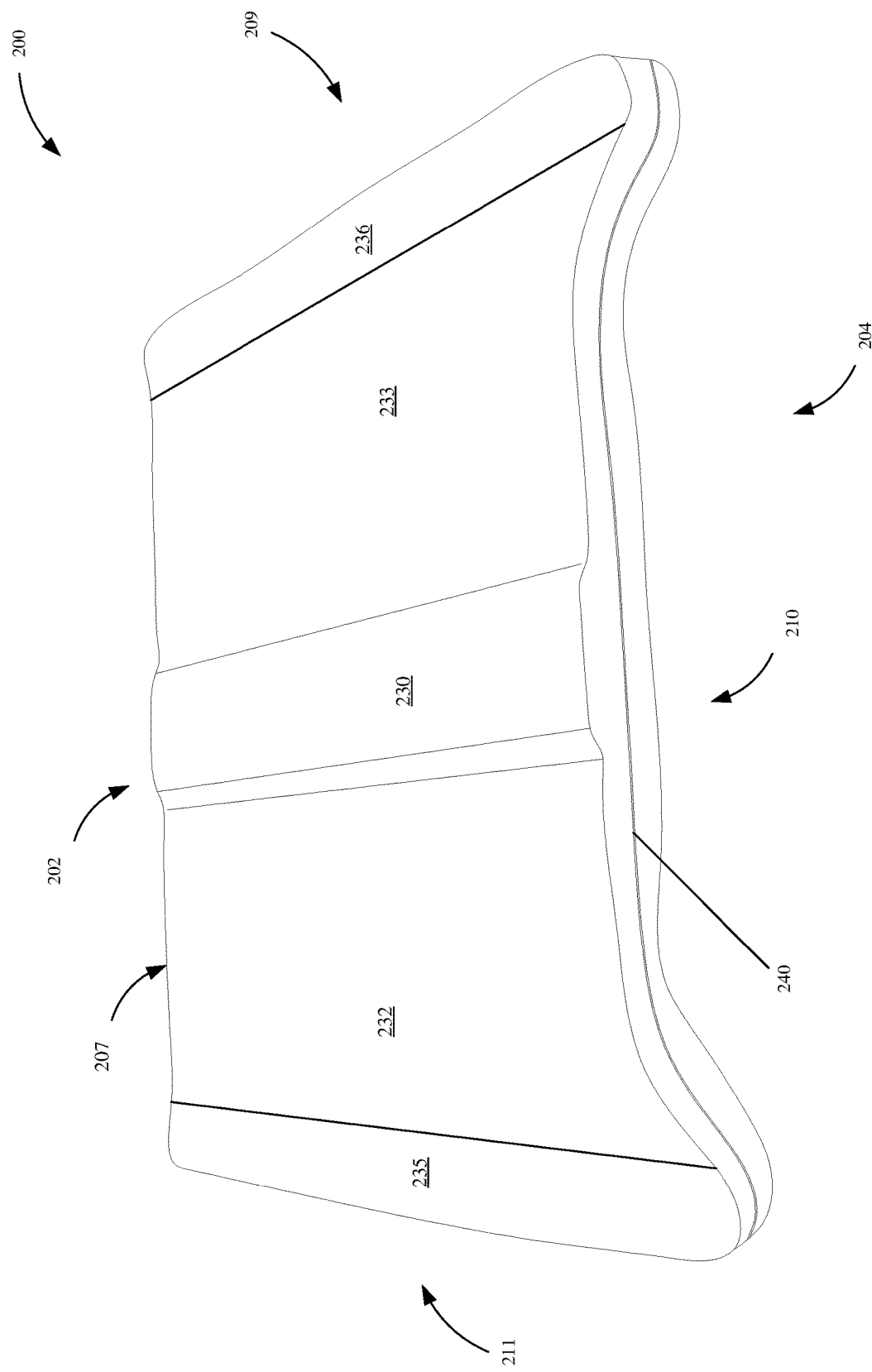
FIG. 5 is a bottom view showing an example gaming support pad.

FIG. 5 is a bottom view of gaming support pad 200. Some items shown in FIG. 5 are similar to those shown in FIG. 4 and thus, are numbered similarly. As shown in FIG. 5, gaming support pad 200 includes bottom side 207, raised surface 230, right raised surface 235, left raised surface 236, right recess 232, left recess 233, and zipper 240. Zipper 240 of cover 245 allows cover 245 to be removed, for example such that it can be cleaned (e.g., machine washing) or replaced, or to allow access to or replacement of inner pad 250. While zipper 240 is shown, other fastening mechanisms are also contemplated, such as buttons, hook and loop, etc. Raised surfaces 230, 235, and 236 are, in one example, formed by padding or other fill material within cover 245. Raised surfaces 230, 235, and 236 have a higher height, relative to other features of bottom side 207 (such as recesses 232 and 233). Raised surfaces 230, 235, and 236 can have variation in their height across their surface area. For example, raised surface 230, from left to right in FIG. 5 (or relative to right side 211 to left side 209, or vice versa) has a progressively increasing height until it reaches an uppermost height, at the uppermost height the raised surface 230 continues to extend across a length of gaming support pad 250 from left to right (or relative to right side 211 to left side 209, or vice versa) for a certain distance at the uppermost height, thus forming a flat portion, until reaching an end of the flat portion whereat the height of the raised surface progressively decreases.

Raised surfaces 235 and 236, disposed at the left and right edges of bottom side 207 of gaming support pad 200, can also have a progressively increasing height. For example, the height of both raised surface 235 and raised surface 236 can progressively increase traveling from their edges nearest raised surface 230 to their outer edges near, or disposed on, right side 211 and left side 209, respectively. While raised surfaces 230, 235, and/or 236 can have a variation in the height, such variation in height need not be the case. In some examples, raised surfaces 230, 235, and 236 can have a uniform, or substantially uniform, height across their surface areas. Raised surfaces 230, 235, and 236 define recesses 232 and 236.

Right recess 232 is defined by right raised surface 235 and raised surface 230. Right recess 232 has a height that is lower than other features of bottom side 206 (such as raised surfaces 230, 235, and/or 236). Right recess 232 is configured to receive a portion of a user's body, such as a portion of a user's leg, for example, the upper portion of user's right leg (e.g., quadriceps area). Left recess 233 is defined by left raised surface 236 and raised surface 230. Left recess 233 has a height that is lower than other features of bottom side 206 (such as raised surfaces 230, 235, and/or 236). Left recess 233 is configured to receive a portion of a user's body, such as a portion of a user's leg, for example, the upper portion of a user's left leg (e.g., quadriceps area).

Raised surfaces 230, 235, and 236 along with recesses 232 and 233 provide proper alignment of gaming support pad 200 when in use by a user. Raised surfaces 230, 235, and 236 can also prevent gaming support pad 200 from unintentionally slipping off a user while in use, such as from a force exerted by a user's body on gaming support pad 200.

While particular shapes and sizes of various features of gaming support pad 200 are illustrated in FIGS. 4-5, it is to be understood that these features can include any number of shapes and sizes.

Figure 6:
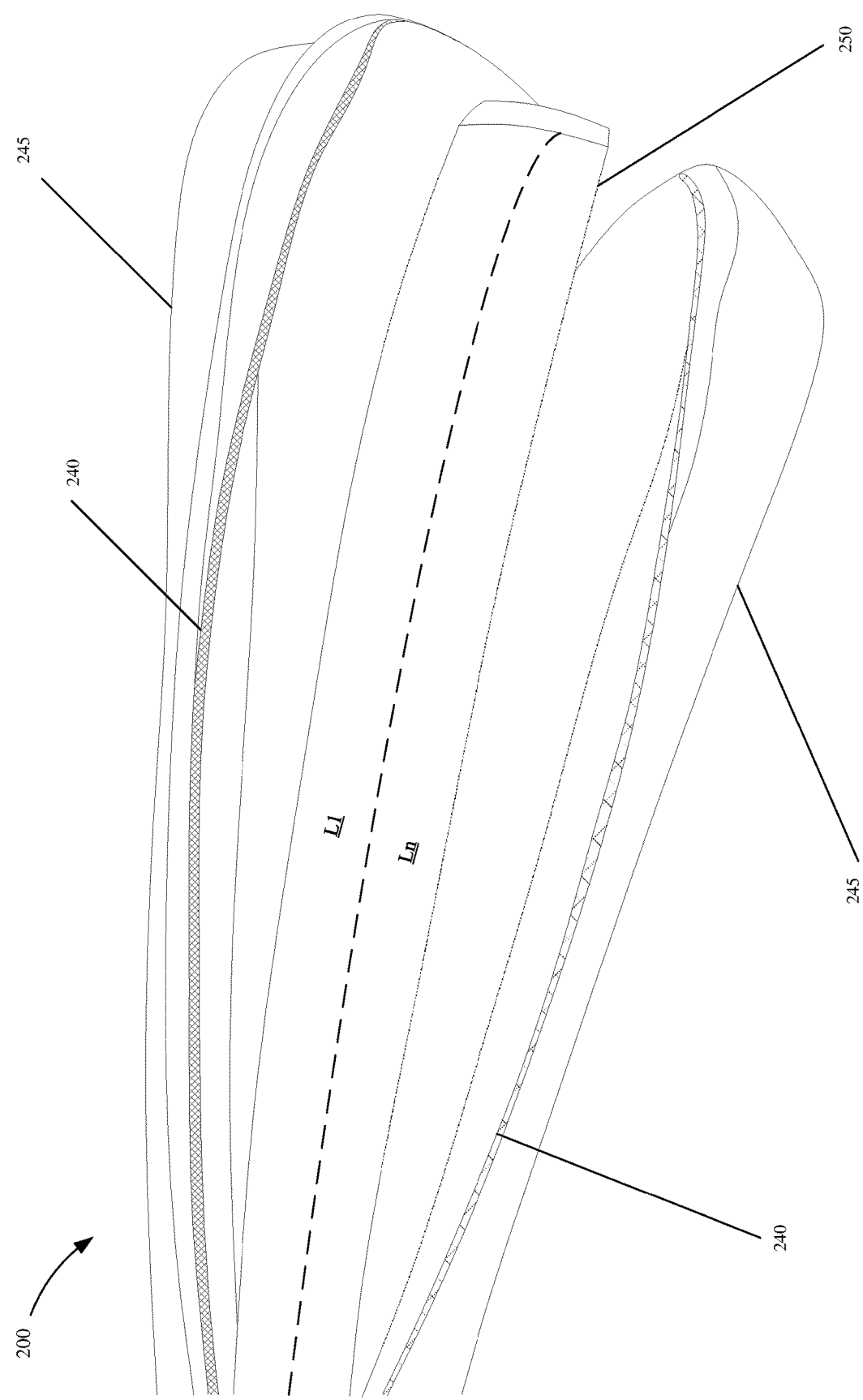
FIG. 6 is a perspective view showing an example gaming support pad.

FIG. 6 is a perspective view of gaming support pad 200. Items in FIG. 6 are similar to items in previous FIGS. and are thus numbered similarly. As shown in FIG. 6, gaming support pad 200 includes zipper 240, cover 245, and inner pad 250. As illustrated in FIG. 6, zipper 240 has been unfastened (e.g., opened) by actuation of a slider (not shown).

Inner pad 250 can include multiple material layers of padding material, such as foam, gel, latex, etc., as illustrated by L1 and $L_n$ in FIG. 6. In other examples, inner pad 250 comprises a single layer of padding material. These layers will be discussed in more detail herein.

Figure 7A:
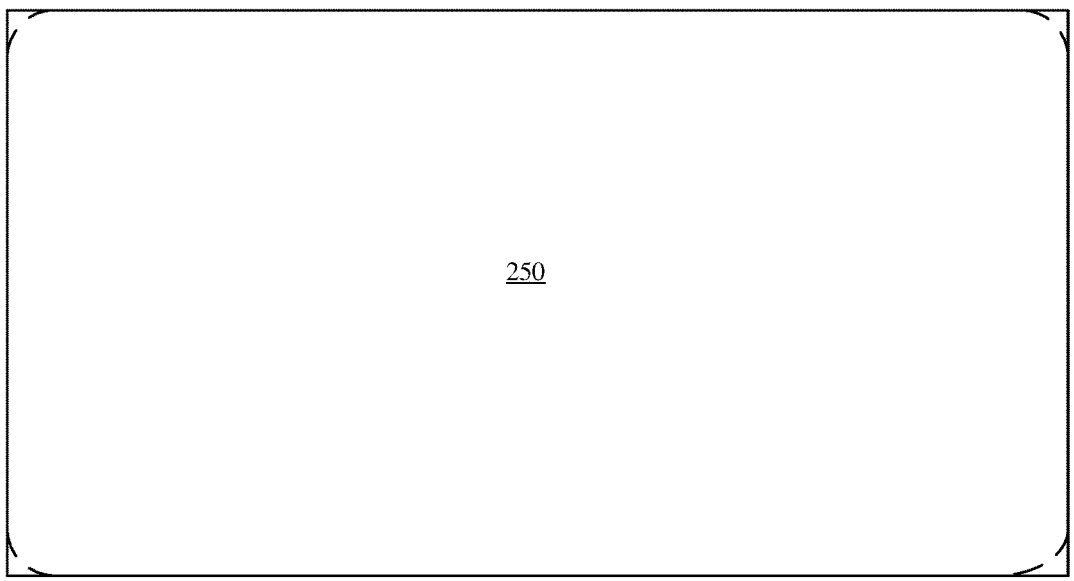
FIG. 7A is a top view showing an example gaming support pad.

FIG. 7A is a top view of inner pad 250. As illustrated in FIG. 7A, inner pad 250 can be a rectangular shape. In some examples, the corners of inner pad 250 may form 90° angles (or approximately 90° angles). In other example, the corners of inner pad 250 may be rounded (as shown in dashed lines in FIG. 7A). Inner pad 250 can, in other examples, take various shapes. In the example shown in FIG. 7A, inner pad 250 has a flat, or substantially flat, top surface. As will be shown in below (FIG. 7B) inner pad 250 has a flat, or substantially flat, bottom surface. In other examples, inner pad can have variable height across its top and bottom surface. For instance, in some examples, inner pad 250 may form or define one or more features of gaming support pad 200, such as one or more recesses or raised surfaces.

Figure 7B:
FIG. 7B is a side view showing an example gaming support pad.
Figure 7B:
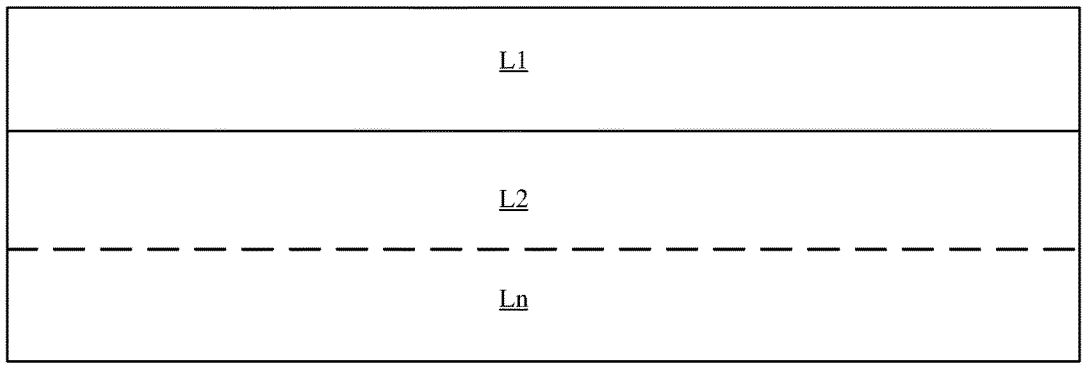

FIG. 7B shows a side view of inner pad 250. As illustrated in FIG. 7B, inner pad 250 can include multiple material layers, as represented by L1, L2, and $L_n$ of padding material (such as foam, gel, latex, etc.) These multiple material layers can be adhered (or otherwise coupled) together using a form of suitable chemical adhesive, such as glue. Each different material layer can have one or more different characteristics (e.g., material type, density, dimensionality, such as thickness, etc.) than at least one of the other material layers. In other examples, each different material layer can have one or more identical characteristics (e.g., material type, density, dimensionality, such as thickness, etc.) than at least one of the other material layers. In some examples, inner pad 250 comprises multiple material layers of padding material, each padding material layer having the same characteristics. In some examples, inner pad 250 comprises multiple material layers of padding material, at least one of the padding material layers having one or more different characteristics (e.g., material type, density, dimensionality, such as thickness, etc.) than at least one other padding material layer.

As can be seen, in some examples, gaming support pad 200 includes a rectangular inner pad having a flat top side and flat bottom side that is covered by a cover that includes padding or other fill material, the padding or other fill material disposed of the cover forming or otherwise defining various features, such as surface features, recesses, and/or raised surfaces, of gaming support pad 200. Further various features, such as surface features, recesses, and/or raised surfaces, of gaming support pad 200 are configured to receive various items, which can include portions of a user's body, such as a portion of a user's arm(s), leg(s), hand(s), wrist(s), etc., as well as various other items not part of a user's body. Additionally, gaming support pad 200 provides comfort and/or ergonomic benefits to a user postured in a gaming stance.

Figure 8:
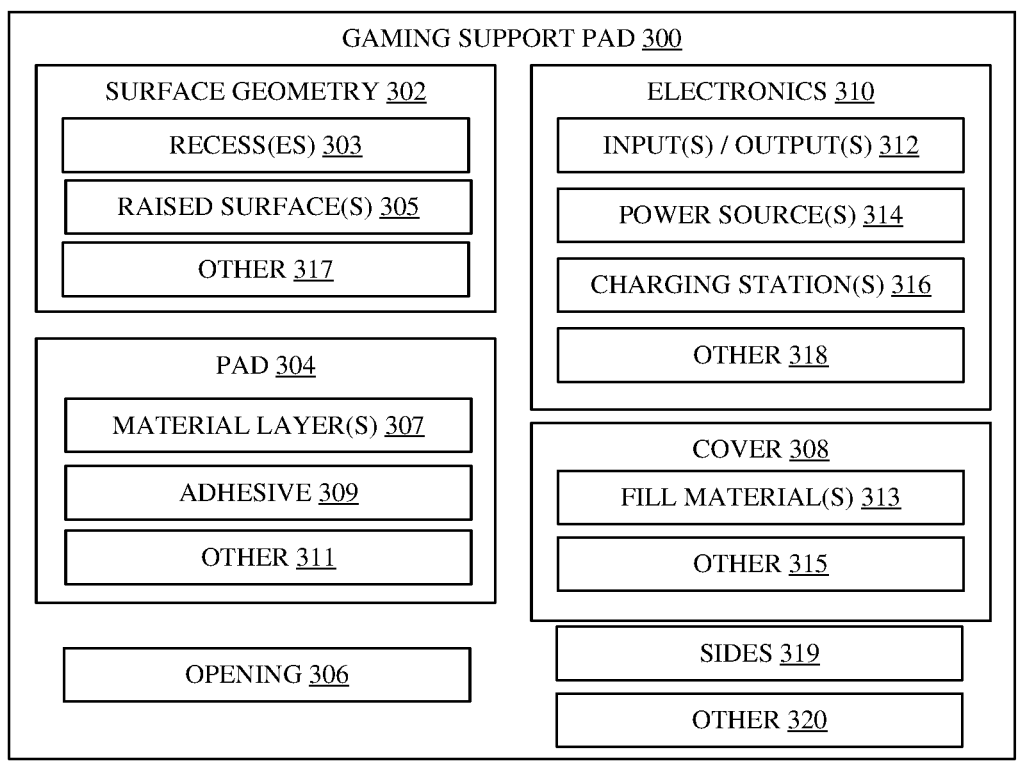
FIG. 8 is a block diagram showing an example gaming support pad.

FIG. 8 is a block diagram showing one example of a gaming support pad 300. Gaming support pad 300 includes surface geometry 302, pad 304, opening 306, cover 308, electronics 310, sides 319, and can include other items 320 as well. Surface geometry 302 can include one or more recesses 303, one or more raised surfaces 305, and can include other items 307, as well. Pad 304 can include one or more material layers 307, adhesive 309, and can include other items 311 as well. Cover 308 can include one or more fill materials 313 and can include other items 315 as well. Electronics 310 can include one or more inputs/outputs 312, one or more power sources 314, one or more charging stations 316, and can include other items 318 as well.

Recesses 303, which can include recesses 108, 110, 116, 118, 210, 216, 218, 232, 233, as well as a variety of other recesses, are features disposed on a side of gaming support pad 300. In some examples, recesses 303 have a height that is relatively lower than other features of gaming support pad (such as raised surfaces 305). In some examples, recesses 305 are configured to receive items, such as portions of a user's body, as well as various other items. Raised surfaces 305, which can include raised surfaces 220, 230, 235, 236 and/or surface features 224, as well as a variety of other raised surfaces, are features included or disposed on a side of gaming support pad 300. In some examples, raised surfaces 305 have a height that is relatively higher than other features of gaming support pad 300 (such as recesses 303). In some examples, raised surfaces 305 are configured to receive items, such as portions of a user's body, as well as various other items. Surface geometry 302 can include other items 307, as well, including, but not limited to, various other surface geometries and/or geometrical features of gaming support pad 200, for example, a variety of projections, contours, and any other suitable features that can, for example, provide comfort and/or ergonomic benefits. For example, surface geometry 302 can include extended portions, such as extended portions 213, which, in one sense, comprise a raised surface of a side (such as a rearward-facing side) of the gaming support pad.

Pad 304, which can include pad 100 or inner pad 250, as well as various other pads, can include one or more material layers 307. Material layers 307 can include material layers 112, 114, 120, L1, L2, and $L_n$, as well as a variety of other material layers. These multiple layers can be adhered (or otherwise coupled) together using a form of suitable chemical adhesive, such as glue. Each different layer can have one or more different characteristics (e.g., material type, density, dimensionality, such as thickness, etc.) than at least one of the other layers. In other examples, each different layer can have one or more identical characteristics (e.g., material type, density, dimensionality, such as thickness, etc.) than at least one of the other layers. In some examples, the material layers 307 can comprises padding material, such as foam, gel, latex, as well as various other suitable padding material. In some examples, various items of surface geometry 302 are part of or formed in pad 304. In other examples, pad 304 can include one or more flat sides, such as a flat top side and a flat bottom side. Pad 304 can also include adhesive 309, such as chemical adhesive (e.g., glue) used to bond or otherwise couple one or more of the material layers 307 together. Pad 304 can include other items 311 as well.

Opening 206 can include opening 113, as well as a variety of other openings.

Cover 308, which can include cover 115 or cover 245, as well as various other covers, is, in one example, configured to enclose pad 304. Cover 308 can include one or more fill materials 313 and can include other items 315. Fill materials 313 can include a variety of different padding (or other fill materials) such as foam, gel, latex, etc. In some examples, fill materials 313 can form one or more items of surface geometry 302. Cover 308 can be substantially permanent (e.g., not purposefully removable) or removable, by, for example, but not limited to, any number of fasteners (e.g., zippers, buttons, etc.), or cover 308 can include a slip-cover. Cover 308 can include any number of suitable materials, for example, but not limited to, a variety of fabrics, for instance, fabrics suitable for the upholstery of furniture, or the covering of items such as pillows, beds, etc. Cover 308 can include any number of colors, and can include additional features (e.g., customizable features) such as logos, designs, etc. In some examples, additional features (such as logos, designs, etc.) can be formed by fill materials 313.

Electronics 310 includes one or more inputs/outputs 312, one or more power sources 314, one or more charging stations 316, and can include other items as well, as indicated by block 318. Inputs/outputs 312 can include ports configured to allow a wired connection with gaming support pad 300. For example, inputs/outputs 312 can include USB ports, power ports, as well as a variety of other ports. Power sources 314 can include a variety of power sources, for example, but not limited to, a battery (e.g., a rechargeable battery). In one example, the rechargeable battery can be charged via inputs/outputs 312. In one example, power sources 314 include a wired connection to an external power source (e.g., wall outlet) through, for example, a power cord electronically connected to gaming support pad 300 via inputs/outputs 312. Power sources 314 provide power to components of gaming support pad 300, for example charging stations 316. Charging stations 316 can include a variety of charging stations. For example, charging stations 316 can be a port configured to receive and charge a battery for use in a gaming console controller or a keyboard/mouse as well as a variety of other user input mechanisms. In cases where the controller or keyboard/mouse, for instance, include a rechargeable battery that is not removable, charging stations 316 can be configured to receive or otherwise coupled to a portion of the controller or keyboard/mouse. In one example, charging stations 316 can include a port (e.g., USB port) to charge, for example, a mobile device (e.g., a cell phone).

Electronics 310 can also include a variety of other items, as represented by 318. For example, electronics 310 can include one or more speaker(s) that are powered by power source(s) 314 (or some other power source). The speakers can be communicatively coupled to a device (e.g., gaming console, computer, mobile device, etc.) for example, via Bluetooth. Electronics 310 can include a fan that is configured to create air flow that can, for example, cool a user's body, or cool a device (e.g., gaming console, computer, controller, keyboard, mouse, mobile device, etc.). Electronics 310 could include display mechanisms (e.g., screens, lights, etc.). These display mechanisms can be user interactive and/or customizable. It is noted that these are examples only. It should be understood that electronics 310 can include a variety of items.

As illustrated in FIG. 8, gaming support pad 300 can also include a number of sides 319. For example, sides 319 may include a top side (e.g., 106, 206, etc.), a bottom side (e.g., 107, 207, etc.), a forward-facing, or front, side (e.g., 102, 202, etc.), a rearward-facing, or back/rear, side (e.g., 104, 204, etc.), a left side (e.g., 109, 209, etc.), and a right side (e.g., 111, 211, etc.). Sides 319 may be defined or formed by various features of gaming support pad, such as fill materials 313 of cover 308 and/or sides of pad 304 (such as sides of inner pad 250).

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A gaming support pad comprising:
   a cover having fill material that forms:
      a first recess on a bottom side of the gaming support pad and a second recess on the bottom side of the gaming support pad, wherein the first recess is configured to receive a first portion of a user's body and the second recess is configured to receive a second portion of the user's body, the first portion and the second portion being different;
      a third recess on a top side of the gaming support pad, the third recess configured to receive and retain a gaming controller; and
      a first plurality of raised surfaces on the top side of the gaming support pad and a second plurality of raised surfaces on the top side of the gaming support pad, the first plurality of raised surfaces and the second plurality of raised surfaces configured to provide slip resistance for portions of the user's body; and
   an inner pad, enclosed by the cover, the inner pad comprising a plurality of different material layers.

2. The gaming support pad of claim 1, wherein the gaming support pad further comprises:
   a fourth recess disposed on a rearward-facing side of the gaming support pad.

3. The gaming support pad of claim 1, wherein the fill material further forms:
   a first raised surface disposed on the bottom side of the gaming support pad.

4. The gaming support pad of claim 3, wherein the fill material further forms:
   a second raised surface disposed on the bottom side of the gaming support pad.

5. The gaming support pad of claim 4, wherein the first raised surface and the second raised surface on the bottom side of the gaining support pad define one of the first recess or the second recess.

6. The gaming support pad of claim 5, wherein the fourth recess extends, at least partially, towards a forward-facing side of the gaming support pad.

7. The gaining support pad of claim 6, wherein the first recess and the second recess extend across a width of the gaming support pad.

8. The gaming support pad of claim 7, wherein the fourth recess is configured to receive a portion of the user's body different than either of the first portion and the second portion.

9. The gaming support pad of claim 8, wherein the inner pad has a flat top side.

10. The gaming support pad of claim 9, wherein the inner pad has a flat bottom side.

11. The gaming support pad of claim 1, wherein at least one of the plurality of material layers comprises foam.

12. The gaming support pad of claim 1, wherein the plurality of material layers are adhered together.

13. The gaming support pad of claim 1, wherein each raised surface of the first plurality of raised surfaces extends along a width of the gaming support pad and is spaced apart from other raised surfaces, of the first plurality of raised surfaces, along a length of the gaming support pad and wherein each raised surface of the second plurality of raised surfaces extends along the width of the gaming support pad and is spaced apart from other raised surfaces, of the second plurality of raised surfaces, along the length of the gaming support pad.

14. The gaming support pad of claim 13, wherein the first plurality of raised surfaces is spaced from the second plurality of raised surfaces along the width of the gaming support pad.

15. The gamin support pad of claim 1, wherein the first plurality of raised surfaces is configured to receive a third portion of the user's body and the second plurality of raised surfaces is configured to receive a fourth portion of the user's body, the third and fourth portions being different.

16. A gaming support pad comprising:
    a cover having fill material that forms:
       a first recess on a bottom side of the gaming support pad and a second recess on the bottom side of the gaming support pad, wherein the first recess is configured to receive a first portion of a user's body and the second recess is configured to receive a second portion of the user's body;
       a first plurality of raised surfaces on the top side of the gaming support pad configured to receive and provide slip resistance for a third portion of the user's body;
       a second plurality of raised surfaces on the top side of the gaming support pad configured to receive and provide slip resistance for a fourth portion of the user's body; and
    an inner pad, enclosed by the cover, the inner pad comprising a plurality of different material layers.

* * * * *